(12) United States Patent
Zhou et al.

(10) Patent No.: US 9,011,721 B2
(45) Date of Patent: Apr. 21, 2015

(54) HALO-SILICATE LUMINESCENT MATERIALS AND PREPARATION METHODS THEREOF

(75) Inventors: Mingjie Zhou, Shenzhen (CN); Rong Wang, Shenzhen (CN); Wenbo Ma, Shenzhen (CN)

(73) Assignee: Ocean's King Lighting Science & Technology Co., Ltd., Shenzhen, Guangdong (CN)

( * ) Notice: Subject to any disclaimer, the term of this patent is extended or adjusted under 35 U.S.C. 154(b) by 42 days.

(21) Appl. No.: 13/881,355

(22) PCT Filed: Dec. 14, 2010

(86) PCT No.: PCT/CN2010/079752
§ 371 (c)(1),
(2), (4) Date: Apr. 24, 2013

(87) PCT Pub. No.: WO2012/079221
PCT Pub. Date: Jun. 21, 2012

(65) Prior Publication Data
US 2013/0221275 A1    Aug. 29, 2013

(51) Int. Cl.
*C09K 11/08* (2006.01)
*C09K 11/61* (2006.01)
(Continued)

(52) U.S. Cl.
CPC ........... *C09K 11/876* (2013.01); *C09K 11/7734* (2013.01); *C09K 11/873* (2013.01); *C09K 11/025* (2013.01)

(58) Field of Classification Search
CPC ........ C09K 11/02; C09K 11/87; C09K 11/58; C09K 11/59; C09K 11/592; C09K 11/7734; C09K 11/774; Y10S 977/773; H01L 33/501; B82Y 40/00

USPC ........ 252/301.4 F, 301.4 H, 301.4 R, 301.36; 428/690; 423/326; 977/773
See application file for complete search history.

(56) References Cited

U.S. PATENT DOCUMENTS

2006/0028122 A1* 2/2006 Wang et al. ............. 313/503
2007/0087195 A1* 4/2007 Meyer et al. ............ 428/403
(Continued)

FOREIGN PATENT DOCUMENTS

CN    101033399 A    9/2007
CN    101292009 A    10/2008
(Continued)

OTHER PUBLICATIONS

Liu Zhiqiang, et al. Action of Chlorione during Preparation of Nanometer Yttrium Oxide by Precipitation with Ammonium Bicarbonate. Journal of the Chinese Rare Earth Society. Jun. 2005, vol. 23, No. 3. p. 373-377.

(Continued)

*Primary Examiner* — Emily Le
*Assistant Examiner* — Lynne Edmondson
(74) *Attorney, Agent, or Firm* — Shimokaji & Associates P.C.

(57) ABSTRACT

Halo-silicate luminescent materials and preparation methods thereof are provided. The said luminescent materials are represented by the following general formula: $(Ba_{1-y}A_y)_{2-x}SiO_4$:$Eu_x$, $D_z$@$M_n$, wherein A is selected from one or two of Sr, Ca, Mg or Zn, D is selected from one of F or Cl, M is selected from at least one of Ag, Au, Pt, Pd or Cu metal nano-particles; @ is coating; $(Ba_{1-y}A_y)_{2-x}SiO_4$:$Eu_x$, $D_z$, is shell; $0.001 < x \leq 0.15$, $0 \leq y \leq 0.5$, $0 \leq z \leq 0.5$, $0 < n \leq 1 \times 10^{-2}$. The said luminescent materials have excellent chemical stability and high luminous intensity. Furthermore, the luminescent materials have controlled spherical shape which is beneficial to the coating screen process and the improved displaying effect. The said preparation methods have simple technique, no pollution, manageable process conditions and low equipment requirement, and are beneficial to industry production.

13 Claims, 2 Drawing Sheets

(51) Int. Cl.
  *C09K 11/87* (2006.01)
  *C09K 11/77* (2006.01)
  *C09K 11/02* (2006.01)

(56) References Cited

U.S. PATENT DOCUMENTS

| | | |
|---|---|---|
| 2007/0210282 A1 | 9/2007 | Kubel et al. |
| 2008/0017831 A1 | 1/2008 | Tamatani et al. |
| 2009/0022766 A1 | 1/2009 | Geddes |
| 2009/0224652 A1* | 9/2009 | Li et al. ............ 313/498 |
| 2009/0289271 A1* | 11/2009 | Tian et al. ............ 257/98 |

FOREIGN PATENT DOCUMENTS

| | | |
|---|---|---|
| CN | 101760195 A | 6/2010 |
| CN | 101775279 A | 7/2010 |
| CN | 101899308 A | 12/2010 |
| JP | 2008185580 A | 8/2008 |
| JP | 2010523739 A | 7/2010 |
| JP | 2010209314 A | 9/2010 |

OTHER PUBLICATIONS

Kwangwon Park Et Al., "White-light generation through Ce3+/Mn2+-codoped and Eu2+-doped Ba1.2Ca0.8SiO4 T-phase phosphors", Journal of Luminescence. Elsevier Bvnorth-Holland. NL.vo 1 • 130. No. 12. Dec. 1, 2010, pp. 2442-2445, XP027407568.ISSN: 0022-2313.

Chowdhury Sanchari et al: "Silver-copper alloy nanoparticles for metal enhanced luminescence". Applied Physics Letters. Americaninstitute of Physics. US. vol. 95. No. 13, Oct. 2, 2009, pp. 131115-1-131115-3, XP012125828.ISSN: 0003-6951. DOI: 10.1063/1.3242007.

Wang et al: "Enhanced luminescence from europium complex owing to surface plasmon resonance of silver nanoparticles".Materials Letters. North Hollandpublishing Company. Amsterdam. NL.vol. 62. No. 12-13, Oct. 26, 2007, pp. 1937-1940, XP022489552. ISSN:0167-577X. DOI:10.1016/J.MATLET.2007.10.045.

Min Yu-Lin et al: "Au@Y2O3:Eu3+ rare earth oxide hollow submicrospheres with encapsulated gold nanoparticles and their optical properties", Solid State Sciences. Elsevier. Paris. FR. vol • 11 (2009), pp. 96-101, XP025840977.ISSN: 1293-2558. DOI:10.1016/J.Solidstatesciences.2008.04.021.

Chris D Geddes et al: "Editorial: Metal-Enhanced Fluorescence". Journal of Fluorescence. vol. 12. No. 2 pp. 121-129. Jun. 1, 2002.

* cited by examiner

HALO-SILICATE LUMINESCENT MATERIALS AND PREPARATION METHODS THEREOF

FIELD OF THE INVENTION

The present invention relates to luminescent materials, more particularly, relates to silicate luminescent materials doped with metal nano-particles. The present invention also relates to a preparation method of silicate luminescent materials.

BACKGROUND OF THE INVENTION

White light LED (light emitting diodes) have attracted an ever-widening attention due to advantages of high efficiency, long lifetime, small size, quick response, no pollution, and energy-saving. At present, one of the primary ways to achieve white light is to combine blue GaN chips with yellow YAG:Ce fluorescent powders. Such method has shortcoming of low color rendering index. However, the main trend and efforts have been directed toward combining near-ultraviolet LED chips and red, green, blue trichromatic powders to produce white light LED, which has high luminous efficiency, tunable color temperature, and high color rendering index. Consequently, LED trichromatic powders that can be efficiently excited by near-ultraviolet are currently studied widely. Therein, luminescent materials which take silicate systems as substrate have raised public concerns due to their features of wide source of raw materials, low-cost, good processing adaptability, moderate synthesis temperature and excellent stability.

Thomas synthesized alkaline-earth metals orthosilicate powders activated by bivalent europium ions. They are a kind of great green powders, compared to YAG fluorescent powders; they have broader excitation spectrum range, better color-purity. Nevertheless, such existing fluorescent powders have problems of low luminous efficiency, bad color rendering, etc.

SUMMARY OF THE INVENTION

Solving the above problems, the present invention provides silicate luminescent materials doped with metal nano-particles which is of low cost and high luminous efficiency, they are represented by general formula of $(Ba_{1-y}A_y)_{2-x}SiO_4:Eu_x, D_z@ M_n$; wherein, A is one or two of Sr, Ca, Mg and Zn, D is any one of F and Cl, M is at least one metal nano-particles of Ag, Au, Pt, Pd and Cu; @ is coating, M nano-particles is a core; $(Ba_{1-y}A_y)_{2-x}SiO_4:Eu_x, D_z$ fluorescent powders are shell; x is in the range of $0.001<x\leq0.15$, y is in the range of $0\leq y\leq0.5$, z is in the range of $0\leq z\leq0.5$, n is molar ratio of M nano-particles to Si in fluorescent powders, n is in the range of $0<n\leq1\times10^{-2}$; preferably, x is in the range of $0.005\leq x\leq0.10$; y is in the range of $0.05\leq y\leq0.2$; z is in the range of $0.01\leq z\leq0.2$; n is in the range of $1\times10^{-4}\leq n\leq5\times10^{-3}$.

The other purpose of the present invention is to provide a preparation method of silicate luminescent materials, comprising:

step S1: adding surface treating agent into M nano-particles colloid, then successively adding ethanol, water, ammonia water and tetra ethoxy silane (where the volume ratio of ethanol, water, ammonia water and tetra ethoxy silane is in the range of 25:8:5:1 to 30:10:7:1), obtaining solution containing nano-sphere of M nano-particles coated in $SiO_2$; wherein, M is at least one nano-particles of Ag, Au, Pt, Pd and Cu;

step S2: regulating pH value of solution containing nano-sphere of M nano-particles coated in $SiO_2$ obtained from step S1 to 5, then adding nitrate solution of Ba, nitrate solution of A and nitrate solution of Eu separately, and adding aqueous nitrate solution of $BaD_2$ or nitrate solution of $AD_2$ according to the stoichiometric ratio of corresponding elements in $(Ba_{1-y}A_y)_{2-x}SiO_4$: $Eu_x, D_z$, next, adding precipitator, after stirring and reacting for 1 to 8 h, placing precipitates into oven for drying to obtain precursor; wherein, A is one or two of Sr, Ca, Mg and Zn, D is any one of F and Cl; x is in the range of $0.001<x\leq0.15$, y is in the range of $0\leq y\leq0.5$, z is in the range of $0\leq z\leq0.5$, n is molar ratio of M nano-particles to Si in fluorescent powders, n is in the range of $0<n\leq1\times10^{-2}$;

step S3: heat treating the precursor obtained from step S2 at $600°\sim1000°$ C. for $2\sim10$ h, and carrying out reducing treatment at $1000°$ C.$\sim1400°$ C. for $1\sim8$ h in reducing atmosphere, after that, cooling and grinding to obtain said silicate luminescent materials represented by the general formula of $(Ba_{1-y}A_y)_{2-x}SiO_4:Eu_x, D_z@ M_n$; wherein, @ is coating, M nano-particles is a core; $(Ba_{1-y}A_y)_{2-x} SiO_4:Eu_x, D_z$ fluorescent powders are shell.

In the step S1 of the above preparation method, said surface treating agent is polyvinyl pyrrolidone, the mass concentration of said surface treating agent in M nano-particles colloid is in the range of 0.005 g/mL to 0.1 g/mL.

In the step S2 of the above preparation method, said precipitator is ammonium bicarbonate, the molar amount of said precipitator is 1.20 to 1.5 times as much as that of luminescent materials $(Ba_{1-y}A_y)_{2-x}SiO_4:Eu_x, D_z@M_n$, that is, the amount of precipitator is excess 20%~50%.

In the step S3 of the above preparation method, said reducing atmosphere is at least one of mixed gases of $N_2$ and $H_2$ reducing atmosphere, CO reducing atmosphere and pure $H_2$ reducing atmosphere.

Compared with the prior art, the silicate luminescent materials of the present invention whose shell is formed by coating metal particles improve its internal quantum efficiency; its luminous intensity are increased by adding metal nano-particles, in addition, the luminescent materials that exhibit spherical shape have excellent stability, controllable size and morphology, high stacking density, which is favorable for coating screen technique and display; besides, the preparation method of the present invention is simple, low demand in equipment, no pollution, easy to control, and suitable for industrial production.

DETAILED DESCRIPTION OF ILLUSTRATED EMBODIMENTS

Silicate luminescent materials provided in the present invention have general formula of $(Ba_{1-y}A_y)_{2-x}SiO_4:Eu_x$, $D_z@M_n$; wherein, A is one or two of Sr, Ca, Mg and Zn, D is any one of F and Cl, M is at least one metal nano-particles of Ag, Au, Pt, Pd and Cu; @ is coating, M nano-particles is a core; $(Ba_{1-y}A_y)_{2-x}$, $(SiO_4:Eu_x, D_z$ fluorescent powders are shell; x is in the range of $0.001 < x \leq 0.15$, y is in the range of $0 \leq y \leq 0.5$, z is in the range of $0 \leq z \leq 0.5$, n is molar ratio of M nano-particles to Si in fluorescent powders, n is in the range of $0 \leq n \leq 1 \times 10^{-2}$; preferably, x is in the range of $0.005 \leq x \leq 0.10$; y is in the range of $0.05 \leq y \leq 0.2$; z is in the range of $0.01 \leq z \leq 0.2$; n is in the range of $1 \times 10^{-4} \leq n \leq 5 \times 10^{-3}$.

M nano-particles colloid can be prepared before preparing the above silicate luminescent materials, the preparation method comprises:

1) weighing and dissolving compound used as source of M in mixed solvent of ethanol and water to prepare and dilute to achieve a solution containing M ions having molar concentration of $1 \times 10^{-3}$ mol/L~$5 \times 10^{-2}$ mol/L; wherein M represents metal nano-particles selecting from one of Ag, Au, Pt, Pd and Cu, compounds used as source of M comprise silver nitrate, chloroauric acid, chloroplatinic acid, palladium and chloride;

2) while magnetically stirring, dissolving assistant agent in solution in the above step 1) to make the mass concentration of assistant agent in the final M nano-particles colloid be in the range of $1 \times 10^{-4}$ g/mL to $5 \times 10^{-2}$ g/mL; wherein, said assistant agent is at least one of polyvinyl pyrrolidone (PVP), sodium citrate, cetyl trimethyl ammonium bromide, sodium dodecyl sulfate and sodium dodecyl sulfonate;

3) weighing and dissolving reducing agent in mixed solvent of ethanol and water to prepare reducing solution having molar concentration of $1 \times 10^{-4}$ mol/L~1 mol/L; wherein, said reducing agent is at least one of hydrazine hydrate, ascorbic acid and sodium borohydride;

4) while magnetically stirring, according to the molar ratio of reducing agent to M ions 3.6:1~18:1, adding the reducing solution obtained from the above step 3) into M nano-particles colloid solution containing assistant agent obtained from the above step 2), stirring, allowing the whole system to react for 10 min~45 min, then obtaining M nano-particles colloid for later use.

Figure 1:
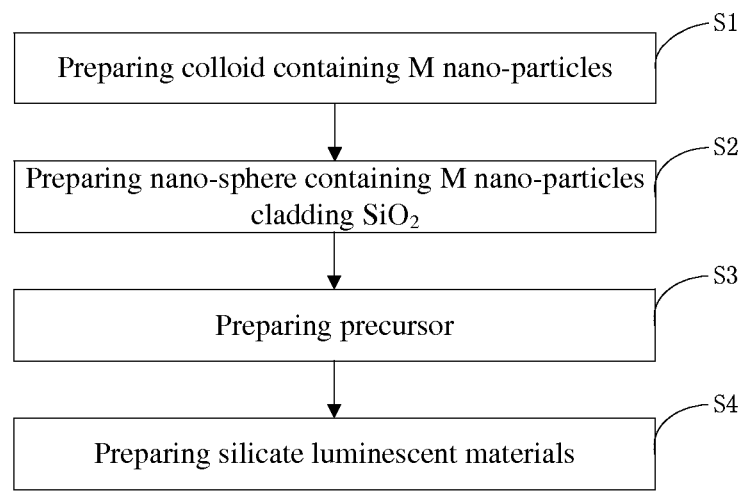
FIG. 1 is a flow chart of preparation method of silicate luminescent material of the present invention.

As shown in FIG. 1, the preparation method of the above silicate luminescent materials comprises:

Step S1: adding the obtained M nano-particles colloid into aqueous solution containing surface treating agent, then successively adding ethanol, water, ammonia water and tetra ethoxy silane (where the volume ratio of ethanol, water, ammonia water and tetra ethoxy silane is in the range of 25:8:5:1 to 30:10:7:1), obtaining solution containing nanosphere of M nano-particles coated in $SiO_2$; wherein, M is at least one nano-particles of Ag, Au, Pt, Pd and Cu;

step S2: regulating pH value of solution containing nanosphere of M nano-particles coated in $SiO_2$ obtained from step S1 to 5, then adding nitrate solution of Ba, nitrate solution of A and nitrate solution of Eu separately, and adding aqueous nitrate solutions of $BaD_2$ or nitrate solution of $AD_2$ according to the stoichiometric ratio of corresponding elements in $(Ba_{1-y}A_y)_{2-x} SiO_4: Eu_x, D_z$, next, adding precipitator, after stirring and reacting for 1 to 8 h, placing precipitates into oven for drying to obtain precursor; wherein, A is one or two of Sr, Ca, Mg and Zn, D is any one of F and Cl; x is in the range of $0.001 < x \leq 0.15$, y is in the range of $0 \leq y \leq 0.5$, z is in the range of $0 \leq z \leq 0.5$, n is molar ratio of M nano-particles to Si in fluorescent powders, n is in the range of $0 < n \leq 1 \times 10^{-2}$;

step S3: placing the precursor obtained from step S2 into muffle furnace and heat treating at 600°~1000° C. for 2~10 h, and then carrying out reducing treatment in reducing atmosphere at 1000° C.~1400° C. for 1~8 h, after that, cooling and grinding to obtain said silicate luminescent materials represented by the general formula of $(Ba_{1-y}A_y)_{2-x}SiO_4:Eu_x$, $D_z@M_n$; wherein, @ is coating, M nano-particles is a core; $(Ba_{1-y}A_y)_{2-x}SiO_4:Eu_x$, $D_z$ fluorescent powders are shell.

In the step S1 of the above preparation method, said surface treating agent is polyvinyl pyrrolidone, the mass concentration of said surface treating agent in M nano-particles colloid is in the range of 0.005 g/mL to 0.1 g/mL.

In the step S2 of the above preparation method, said precipitator is ammonium bicarbonate, the molar amount of said precipitator is 1.20 to 1.5 times as much as that of luminescent materials $(Ba_{1-y}A_y)_{2-x}SiO_4:Eu_x$, $D_z@M_n$, that is, the amount of precipitator is preferably excess 20%~50%, thus ensuring complete precipitation. In this step, white precipitates will be produced after adding ammonium bicarbonate, and then the reaction is conducted while stirring for a certain time, the precipitates are placed into oven for drying after the reaction to obtain precursor.

In the step S3 of the above preparation method, said reducing atmosphere is at least one of mixed gases of $N_2$ and $H_2$ reducing atmosphere, CO reducing atmosphere and pure $H_2$ reducing atmosphere.

The foregoing silicate luminescent materials whose shell is formed by coating metal particles improve its internal quantum efficiency; its luminous intensity are increased by adding metal nano particles, in addition, the luminescent materials that exhibit spherical shape have excellent stability, controllable size and morphology, high stacking density, which is favorable for coating screen technique and display.

The silicate luminescent materials doped with metal nanoparticles of the present invention having advantages of excellent stability, better luminescence property can be widely used in the fields of lighting, display and others.

Further description of the present invention will be illustrated, which combined with preferred embodiments in the drawings.

EXAMPLE 1

Preparation of Silicate Luminescent Material $(Ba_{0.9}Sr_{0.1})_{1.85}SiO_4:Eu_{0.15}, Cl_{0.20} @Pt_{1 \times 10^{-2}}$ Doped with Platinum (Pt) Nano-Particles At room temperature, weighing and dissolving 0.30 grams (g) of polyvinyl pyrrolidone (PVP) in 4 milliliters (mL) of deionized water, dissolving, then adding 4 mL of $1 \times 10^{-2}$ mol/L platinum metal nano-particles, stirring for 18 hours (h), then adding successively 25 mL of absolute ethanol, 5 mL of ammonium water ammonia water, 1.0 mL of tetra ethoxy silane while stirring; reacting for 6 h, after that, regulating pH of the solution to 5, then adding 21 mL of 0.3 mol/L aqueous solution of $Ba(NO_3)_2$, 1.5 mL of 0.5 mol/L aqueous solution of $Sr(NO_3)_2$, 3 mL of 0.2 mol/L aqueous solution of $Eu(NO_3)_3$, 2 mL of 0.2 mol/L aqueous solution of $BaCl_2$, stirring thoroughly, then dripping slowly 20 mL of 0.5 mol/L $NH_4HCO_3$, stirring and reacting for 5 h, then placing precipitates into oven for drying, treating with heat at 600° C. for 10 h, placing into agate mortar and grinding thoroughly to mix well, then transferring powders to corundum crucible, sintering in reducing atmosphere of CO at 1300° C. for 1 h for reduction, cooling to room temperature and $(Ba_{0.9}$ $Sr_{0.1})_{1.85}SiO_4$: $Eu_{0.15}$, $Cl_{10.20}$@$Pt_{1\times10}{}^{-2}$ luminescent material doped with Pt nano-particles is obtained.

EXAMPLE 2

Preparation of Silicate Luminescent Material $Ba_{1.99}SiO_4$:$Eu_{0.01}$@$Ag_{1.25\times10}{}^{-3}$ Doped with Silver (Ag) Nano-Particles At room temperature, weighing and dissolving 0.1 g of polyvinyl pyrrolidone in 5 mL of deionized water, dissolving, then adding 5 mL of $1\times10^{-3}$ mol/L silver metal nano-particles, stirring for 12 h, then adding successively 25 mL of absolute ethanol, 6 mL of ammonia water, 1.0 mL of tetra ethoxy silane while stirring; reacting for 3 h, after that, regulating pH of the solution to 5, then adding 26.7 mL of 0.3 mol/L aqueous solution of $Ba(NO_3)_2$, 0.4 mL of 0.1 mol/L aqueous solution of $Eu(NO_3)_3$, stirring thoroughly, then dripping slowly 10 mL of 1 mol/L $NH_4HCO_3$, stirring and reacting for 3 h, then placing precipitates into oven for drying, treating with heat at 800° C. for 4 h, placing into agate mortar and grinding thoroughly to mix well, then transferring powders to corundum crucible, sintering in tube furnace in weak reducing atmosphere of 95% $N_2$ plus 5% $H_2$ at 1200° C. for 4 h for reduction, cooling to room temperature and $Ba_{1.99}SiO_4$:$Eu_{0.01}$@$Ag_{1.25\times10}{}^{-3}$ luminescent material doped with Ag nano-particles is obtained.

Figure 2:
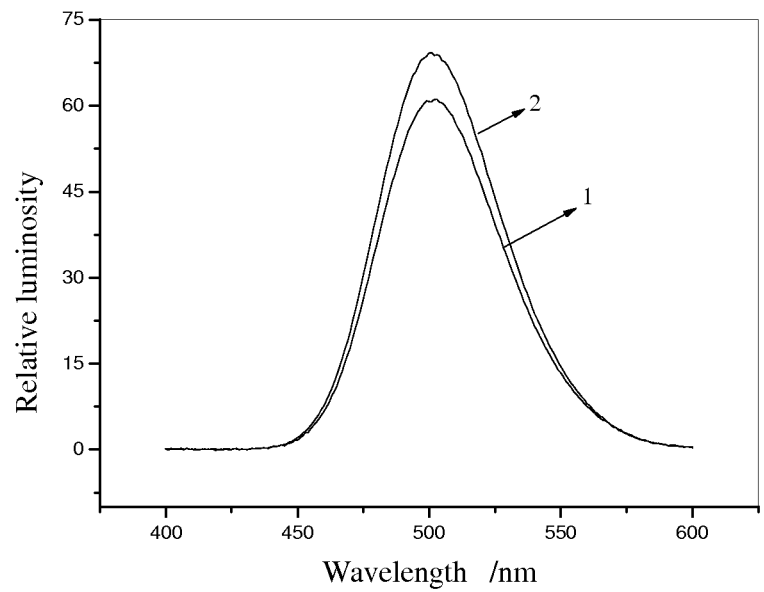
FIG. 2 is comparison between the spectrums of the luminescent materials prepared in Example 2 of the present invention which are excited at 460 nm. Herein, curve 1 is luminescence spectrum of $Ba_{1.99}SiO_4:Eu_{0.01}$ luminescent material without coating metal nano-particle Ag, curve 2 is luminescence spectrum of $Ba_{1.99}SiO_4:Eu_{0.01}@Ag_{1.25\times10^{-3}}$ luminescent material coating metal nano-particle Ag.

As shown in FIG. 2, the comparison of spectrums of the luminescent materials $Ba_{1.99}SiO_4$:$Eu_{0.01}$@$Ag_{1.25\times10}{}^{-3}$ coating metal nano-particles Ag prepared in the present embodiment with luminescent materials $Ba_{1.99}SiO_4$:$Eu_{0.01}$ without coating metal nano-particles excited at 460 nm, it can be seen from the emission peak appears at 505 nm that luminous intensity of the luminescent materials coating metal nano-particles was increased by 15% compared to that of the samples without coating metal nano-particles at 505 nm. The luminescent materials of the present embodiment had excellent stability, good color-purity and high luminous efficiency.

EXAMPLE 3

Preparation of Silicate Luminescent Material $(Ba_{0.5}Ca_{0.5})_{1.999}SiO_4$:$Eu_{0.001}$, $F_{0.5}$@$Au_{1\times10}{}^{-4}$ Doped with Au Nano-Particles At room temperature, weighing and dissolving 0.15 g of polyvinyl pyrrolidone in 4 mL of deionized water, dissolving, then adding 6 mL of $1\times10^{-4}$ mol/L Au metal nano-particles, stirring for 12 h, then adding successively 35 mL of absolute ethanol, 10 mL of ammonia water, 1.5 mL of tetra ethoxy silane while stirring; reacting for 4 h, after that, regulating pH of the solution to 5, then adding 6 mL of 1 mol/L solution of $Ca(NO_3)_2$, 20 mL of 0.3 mol/L solution of $Ba(NO_3)_2$, 6 mL of 0.01 mol/L solution of $Eu(NO_3)_3$, 3 mL of 0.5 mol/L solution of $BaF_2$, stirring thoroughly, then dripping slowly 30 mL of 0.5 mol/L $NH_4HCO_3$, stirring and reacting for 2 h, then placing precipitates into oven for drying, treating with heat at 1000° C. for 2 h, placing into agate mortar and grinding thoroughly to mix well, then transferring powders to corundum crucible, sintering in tube furnace in reducing atmosphere of $H_2$ at 1300° C. for 8 h for reduction, cooling to room temperature and $(Ba_{0.5}Ca_{0.5})_{1.999}SiO_4$: $Eu_{0.001}$, $F_{0.5}$@$Au_{1\times10}{}^{-4}$ luminescent material doped with Au nano-particles is obtained.

EXAMPLE 4

Preparation of Silicate Luminescent Material $Ba_{1.99}SiO_4$:$Eu_{0.01}$:$F_{0.1}$@$Ag_{1.25\times10}{}^{-3}$ Doped with Ag Nano-Particles At room temperature, weighing and dissolving 0.10 g of polyvinyl pyrrolidone in 5 mL of deionized water, dissolving, then adding 5 mL of $1\times10^{-3}$ mol/L Ag metal nano-particles, stirring for 12 h, then adding successively 25 mL of absolute ethanol, 6 mL of ammonia water, 1.0 mL of tetra ethoxy silane while stirring; reacting for 3 h, after that, regulating pH of the solution to 5, then adding 26 mL of 0.3 mol/L solution of $Ba(NO_3)_2$, 0.4 mL of 0.1 mol/L solution of $Eu(NO_3)_3$, 2 mL of 0.1 mol/L solution of $BaF_2$, stirring thoroughly, then dripping slowly 10 mL of 1 mol/L $NH_4HCO_3$, stirring and reacting for 3 h, then placing precipitates into oven for drying, treating with heat at 800° C. for 2 h, placing into agate mortar and grinding thoroughly to mix well, then transferring powders to corundum crucible, sintering in tube furnace in weak reducing atmosphere of 95% $N_2$ plus 5% $H_2$ at 1200° C. for 4 h for reduction, cooling to room temperature and $Ba_{1.99}SiO_4$:$Eu_{0.01}$:$F_{0.1}$@$Ag_{1.25\times10}{}^{-3}$ luminescent material doped with Ag nano-particles is obtained.

Figure 3:
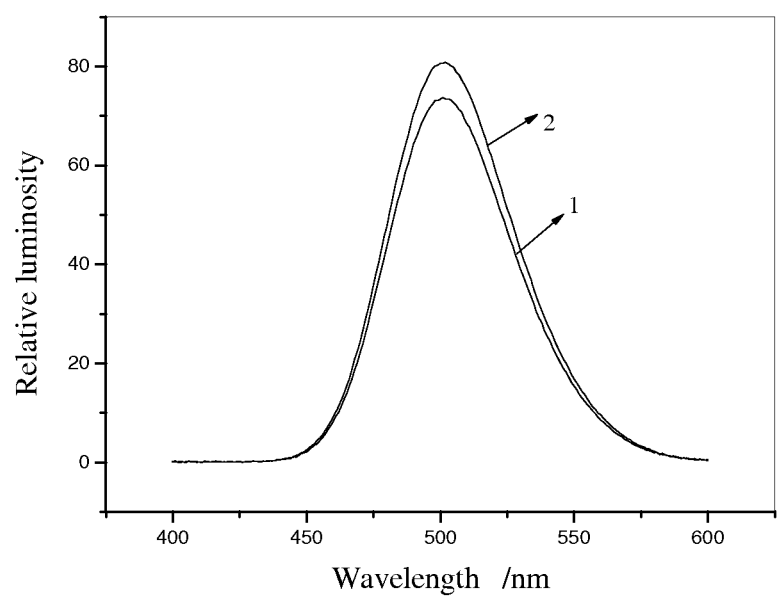
FIG. 3 is comparison between the spectrums of the luminescent materials prepared in Example 4 of the present invention which are excited at 460 nm. Herein, curve 1 is luminescence spectrum of $Ba_{1.99}SiO_4:Eu_{0.01}:F_{0.1}$ luminescent material without coating metal nano-particle Ag, curve 2 is luminescence spectrum of $Ba_{1.99}SiO_4:Eu_{0.01}:F_{0.1}@Ag_{1.25\times10^{-3}}$ luminescent material coating metal nano-particle Ag.

As shown in FIG. 3, the comparison of spectrums of the luminescent materials $Ba_{1.99}SiO_4$:$Eu_{0.01}$:$F_{0.1}$@ $Ag_{1.25\times10}{}^{-3}$ coating metal nano-particles Ag prepared in the present embodiment with luminescent materials $Ba_{1.99}SiO_4$:$Eu_{0.01}$: $F_{0.1}$ without coating metal nano-particles excited at 460 nm, it can be seen from the emission peak appears at 505 nm that luminous intensity of the luminescent materials coating metal nano-particles was increased by 12% compared to that of the samples without coating metal nano-particles at 505 nm. The luminescent materials of the present embodiment had excellent stability, good color-purity and high luminous efficiency.

EXAMPLE 5

Preparation of Silicate Luminescent Material $(Ba_{0.8}Mg_{0.2})_{1.95}SiO_4$:$Eu_{0.05}$@$Ag_{5\times10}{}^{-3}$ Doped with Ag Nano-Particles At room temperature, weighing and dissolving 0.08 g of polyvinyl pyrrolidone in 8 mL of deionized water, dissolving, then adding 2 mL of $1\times10^{-2}$ mol/L Ag metal nano-particles, stirring for 18 h, then adding successively 20 mL of absolute ethanol, 4 mL of ammonia water, 1.0 mL of tetra ethoxy silane while stirring; reacting for 6 h, after that, regulating pH of the solution to 5, then adding 20.8 mL of 0.3 mol/L solution of $Ba(NO_3)_2$, 5.2 mL of 0.3 mol/L solution of $Mg(NO_3)_2$, 2 mL of 0.1 mol/L solution of $Eu(NO_3)_3$, stirring thoroughly, then dripping slowly 12 mL of 1 mol/L $NH_4HCO_3$, stirring and reacting for 8 h, then placing precipitates into oven for drying, treating with heat at 900° C. for 5 h, placing into agate mortar and grinding thoroughly to mix well, then transferring powders to corundum crucible, sintering in tube furnace in weak reducing atmosphere of 95% $N_2$ plus 5% $H_2$ at 1150° C. for 6 h for reduction, cooling to room temperature and $(Ba_{0.8}Mg_{0.2})_{1.95}SiO_4$:$Eu_{0.05}$@$Ag_{5\times10}{}^{-3}$ luminescent material doped with Ag nano-particles is obtained.

EXAMPLE 6

Preparation of Silicate Luminescent Material $(Ba_{0.7}Sr_{0.2}Mg_{0.1})_{1.9}SiO_4$:$Eu_{0.1}$, $Cl_{0.01}$@$Cu_{4\times10-4}$ doped with Cu Nano-Particles At room temperature, weighing and dissolving 0.18 g of polyvinyl pyrrolidone in 8 mL of deionized water, dissolving, then adding 2 mL of $1\times10^{-3}$ mol/L Cu metal nano-particles, stirring for 24 h, then adding successively 30 mL of absolute ethanol, 8 mL of ammonia water, 1.2 mL of tetra ethoxy silane while stirring; reacting for 2 h, after that, regulating pH of the solution to 5, then adding 6 mL of 0.3 mol/L solution of $Sr(NO_3)_2$, 21.3 mL of 0.3 mol/L solution of $Ba(NO_3)_2$, 4.6 mL of 0.2 mol/L solution of $Mg(NO_3)_2$, 4.8 mL of 0.1 mol/L solution of $Eu(NO_3)_3$, 4.8 mL of 0.01 mol/L solution of $SrCl_2$, stirring thoroughly, then dripping slowly 12 mL of 1 mol/L $NH_4HCO_3$, stirring and reacting for 5 h, then placing precipitates into oven for drying, treating with heat at 700° C. for 6 h, placing into agate mortar and grinding thoroughly to mix well, then transferring powders to corundum crucible, sintering in tube furnace in reducing atmosphere of $H_2$ at 1350° C. for 6 h for reduction, cooling to room temperature and $(Ba_{0.7}Sr_{0.2}Mg_{0.1})_{1.9}SiO_4$: $Eu_{0.1},Cl_{0.01}@Cu_{5\times10^{-4}}$ luminescent material doped with Cu nano-particles is obtained.

EXAMPLE 7

Preparation of Silicate Luminescent Material $(Ba_{0.95}Zn_{0.05})_{1.995}SiO_4$:$Eu_{0.00}@Pd_{3\times10^{-4}}$ Doped with Pd Nano-Particles At room temperature, weighing and dissolving 0.5 g of PVP in 10 mL of deionized water, dissolving, then adding 4 mL of $3\times10^{-4}$ mol/L Au metal nano-particles, stirring for 24 h, then adding successively 28 mL of absolute ethanol, 7 mL of ammonia water, 1.0 mL of tetra ethoxy silane while stirring; reacting for 4 h, after that, regulating pH of the solution to 5, then adding 25.3 mL of 0.3 mol/L solution of $Ba(NO_3)_2$, 2 mL of 0.2 mol/L solution of $Zn(NO_3)_2$, 2 mL of 0.01 mol/L solution of $Eu(NO_3)_3$, stirring thoroughly, then dripping slowly 20 mL of 0.5 mol/L $NH_4HCO_3$, stirring and reacting for 1 h, then placing precipitates into oven for drying, treating with heat at 600° C. for 8 h, placing into agate mortar and grinding thoroughly to mix well, then transferring powders to corundum crucible, sintering in tube furnace in weak reducing atmosphere of 95% $N_2$ plus 5% $H_2$ at 1400° C. for 3 h for reduction, cooling to room temperature and $(Ba_{0.95}Zn_{0.05})_{1.995}SiO_4$:$Eu_{0.005}@Pd_{3\times10^{-4}}$ luminescent material doped with Pd nano-particles is obtained.

EXAMPLE 8

Preparation of silicate luminescent material $Ba_{1.95}SiO_4$:$Eu_{0.05}@(Ag_{0.5}/Au_{0.5})_{2\times10^{-3}}$ doped with (Ag/Au) nano-particles At room temperature, weighing and dissolving 0.15 g of PVP in 6 mL of deionized water, dissolving, then adding 4 mL of $2\times10^{-3}$ mol/L $Ag_{0.5}/Au_{0.5}$ nano-particles, stirring for 15 h, then adding successively 30 mL of absolute ethanol, 7 mL of ammonia water, 1.0 mL of tetra ethoxy silane while stirring; reacting for 6 h, after that, regulating pH of the solution to 5, then adding 26 mL of 0.3 mol/L solution of $Ba(NO_3)_2$, 2 mL of 0.1 mol/L solution of $Eu(NO_3)_2$, stirring thoroughly, then dripping slowly 25 mL of 0.5 mol/L $NH_4HCO_3$, stirring and reacting for 7 h, then placing precipitates into oven for drying, treating with heat at 800° C. for 5 h, placing into agate mortar and grinding thoroughly to mix well, then transferring powders to corundum crucible, sintering in tube furnace in weak reducing atmosphere of 95% $N_2$ plus 5% $H_2$ at 1300° C. for 2 h for reduction, cooling to room temperature and $Ba_{1.99}SiO_4$:$Eu_{0.01}@(Ag_{0.5}/Au_{0.5})_{2\times10^{-3}}$ luminescent material doped with (Ag/Au) nano-particles is obtained.

At room temperature, weighing and dissolving 0.15 g of PVP in 6 mL of deionized water, dissolving, then adding 4 mL of $2\times10^{-3}$ mol/L $Ag_{0.5}/Au_{0.5}$ nano-particles, stirring for 15 h, then adding successively 30 mL of absolute ethanol, 7 mL of ammonium water, 1.0 mL of tetra ethoxy silane while stirring; reacting for 6 h, after that, regulating pH of the solution to 5, then adding 26 mL of 0.3 mol/L solution of $Ba(NO_3)_2$, 2 mL of 0.1 mol/L solution of $Eu(NO_3)_2$, stirring thoroughly, then dripping slowly 25 mL of 0.5 mol/L $NH_4HCO_3$, stirring and reacting for 7 h, then placing precipitates into oven for drying, treating with heat at 800° C. for 5 h, placing into agate mortar and grinding thoroughly to mix well, then transferring powders to corundum crucible, sintering in tube furnace in weak reducing atmosphere of 95% $N_2$ plus 5% $H_2$ at 1300° C. for 2 h for reduction, cooling to room temperature and $Ba_{1.99}SiO_4$:$Eu_{0.01}@(Ag_{0.5}/Au_{0.5})_{2\times10^{-3}}$ luminescent material doped with $(Ag_{0.5}/Au_{0.5})$ nano-particles is obtained.

While the present invention has been described with reference to particular embodiments, it will be understood that the embodiments are illustrative and that the invention scope is not so limited. Alternative embodiments of the present invention will become apparent to those having ordinary skill in the art to which the present invention pertains. Such alternate embodiments are considered to be encompassed within the spirit and scope of the present invention. Accordingly, the scope of the present invention is described by the appended claims and is supported by the foregoing description.

What is claimed is:

1. Silicate luminescent materials represented by the general formula of $(Ba_{1-y}A_y)_{2-x}SiO_4$:$Eu_x$, $D_z@M_n$, wherein A is one or two of Sr, Ca, Mg and Zn, D is any one of F and Cl, M is at least one metal nano-particles of Ag, Au, Pt, Pd and Cu; @ is coating, M nano-particles is a core; $(Ba_{1-y}A_y)_{2-x}SiO_4$:$Eu_x$, $D_z$ fluorescent powders are shell; x is in the range of $0.001<x\leq0.15$, y is in the range of $0\leq y\leq 0.5$, z is in the range of $0\leq z\leq 0.5$, n is molar ratio of M nano-particles to Si in fluorescent powders, n is in the range of $0<n\leq 1\times10^{-2}$.

2. Silicate luminescent materials according to claim 1, wherein
x is in the range of $0.005\leq x\leq 0.10$; y is in the range of $0.05\leq y\leq 0.2$; z is in the range of $0.01\leq z\leq 0.2$; n is in the range of $1\times10^{-4}\leq n\leq 5\times10^{-3}$.

3. A preparation method of silicate luminescent materials, comprising:
step S1: adding surface treating agent into M nano-particles colloid, then successively adding ethanol, water, ammonia water and tetra ethoxy silane, obtaining solution containing nano-sphere of M nano-particles coated in $SiO_2$; wherein, M is at least one nano-particles of Ag, Au, Pt, Pd and Cu;
step S2: regulating pH value of solution containing nano-sphere of M nano-particles coated in $SiO_2$ obtained from step S1 to 5, then adding nitrate solutions of Ba, A and Eu separately, and adding aqueous nitrate solutions of $BaD_2$ or $AD_2$ according to the stoichiometric ratio of corresponding elements in $(Ba_{1-y}A_y)_{2-x}SiO_4$:$Eu_x$, $D_z$, next, adding precipitator, after stirring and reacting for 1 to 8 h, placing precipitates into oven for drying to obtain precursor; wherein, A is one or two of Sr, Ca, Mg and Zn, D is any one of F and Cl; x is in the range of $0.001<x\leq 0.15$, y is in the range of $0\leq y\leq 0.5$, z is in the range of $0\leq z\leq 0.5$, n is molar ratio of M nano-particles to Si in fluorescent powders, n is in the range of $0<n\leq 1\times10^{-2}$;
step S3: cooling and grinding the precursor obtained from step S2 after heat treatment and reducing treatment, obtaining said silicate luminescent materials represented by the general formula of $(Ba_{1-y}A_y)_{2-x}SiO_4$:$Eu_x$, $D_z@M_n$; wherein, @ is coating, M nano-particles is a core; $(Ba_{1-y}A_y)_{2-x}SiO_4:Eu_x$, $D_z$ fluorescent powders are shell.

4. The preparation method of silicate luminescent materials according to claim 3, wherein, in said step S1, said surface treating agent is polyvinyl pyrrolidone, the mass concentration of said surface treating agent in M nano-particles colloid is in the range of 0.005 g/mL to 0.1 g/mL.

5. The preparation method of silicate luminescent materials according to claim 3, wherein, in said step S1, the volume ratio of said ethanol, water, ammonia water and tetra ethoxy silane is in the range of 25:8:5:1 to 30:10:7:1.

6. The preparation method of silicate luminescent materials according to claim 3, wherein, in said step S2, said precipitator is ammonium bicarbonate, the molar amount of said precipitator is 1.20 to 1.5 times as much as that of luminescent materials $(Ba_{1-y}A_y)_{2-x}SiO_4:EU_x$, $D_z@M_n$.

7. The preparation method of silicate luminescent materials according to claim 3, wherein, in said step S2, x is in the range of $0.005 \le x \le 0.10$; y is in the range of $0.05 \le y \le 0.2$; z is in the range of $0.01 \le z \le 0.2$; n is in the range of $1 \times 10^{-4} \le n \le 5 \times 10^{-3}$.

8. The preparation method of silicate luminescent materials according to claim 3, wherein, in said step S3, said heat treatment includes: heat treatment carried out at 600° C. to 1000° C. for 2 to 10 h.

9. The preparation method of silicate luminescent materials according to claim 3, wherein, in said step S3, said reducing treatment includes: reducing treatment carried out at 1000° C. to 1400° C. for 1 to 8 h.

10. The preparation method of silicate luminescent materials according to claim 3, wherein, said reducing treatment is carried out in reducing atmosphere, said reducing atmosphere is at least one of mixed gases of $N_2$ and $H_2$ reducing atmosphere, CO reducing atmosphere, and pure $H_2$ reducing atmosphere.

11. The preparation method of silicate luminescent materials according to claim 4, wherein, in said step S1, the volume ratio of said ethanol, water, ammonia water and tetra ethoxy silane is in the range of 25:8:5:1 to 30:10:7:1.

12. The preparation method of silicate luminescent materials according to claim 6, wherein, in said step S2, x is in the range of $0.005 \le x \le 0.10$; y is in the range of $0.05 \le y \le 0.2$; z is in the range of $0.01 \le z \le 0.2$; n is in the range of $1 \times 10^{-4} \le n \le 5 \times 10^{-3}$.

13. The preparation method of silicate luminescent materials according to claim 9, wherein, said reducing treatment is carried out in reducing atmosphere, said reducing atmosphere is at least one of mixed gases of $N_2$ and $H_2$ reducing atmosphere, CO reducing atmosphere, and pure $H_2$ reducing atmosphere.

* * * * *